July 20, 1954
H. W. PATTERSON
2,683,896
APPARATUS FOR EXTRUDING ARTICLES
Filed Dec. 18, 1950
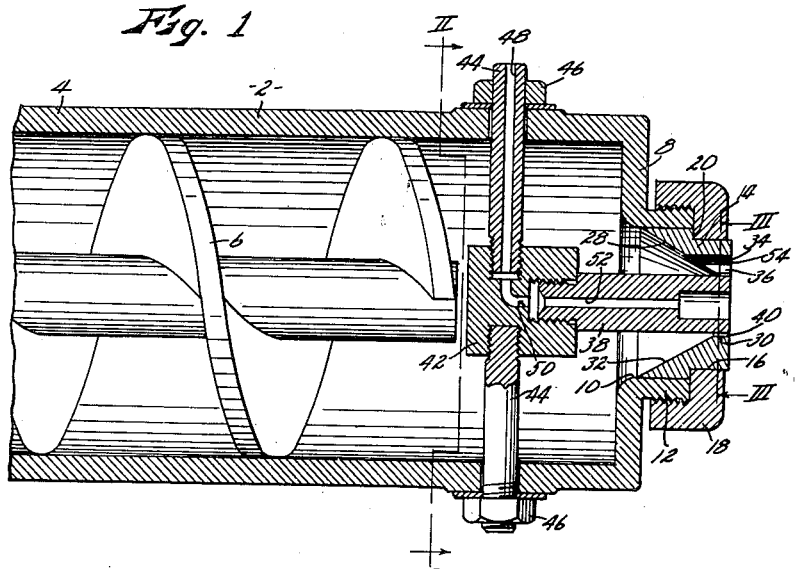
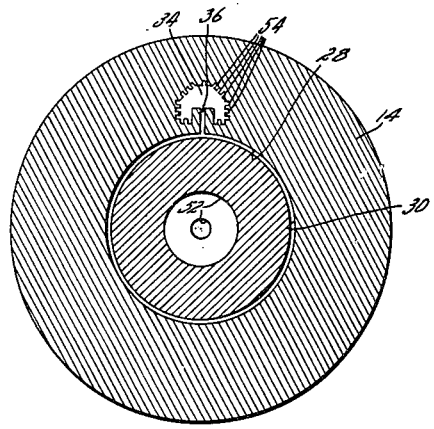
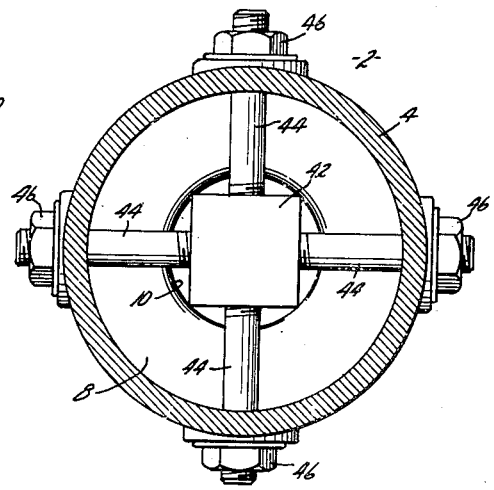
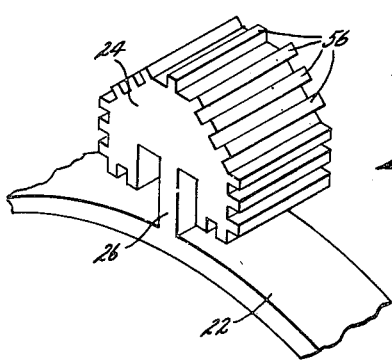
INVENTOR.
Herman W. Patterson
BY
Hamilton & Hamilton
Attorneys.

Patented July 20, 1954

2,683,896

UNITED STATES PATENT OFFICE 2,683,896

APPARATUS FOR EXTRUDING ARTICLES

Herman W. Patterson, Kansas City, Mo.

Application December 18, 1950, Serial No. 201,402

2 Claims. (Cl. 18—14)

This invention relates to new and useful improvements in apparatus for producing articles by the process of extrusion, and relates particularly to the production of extruded articles having both relatively thick and relatively thin walls or sections.

The principal object of the present invention is the provision of an apparatus for producing extruded articles having relatively thick and relatively thin sections. Heretofore, when extruding articles of this nature, particularly in relatively pliable, elastic materials such as rubber, great difficulty has been experienced in producing articles which are straight and uniform in cross-section. This difficulty is caused by the fact that the stock material, being plastic and more or less free flowing as it passes through the die, passes through the relatively thick portions of the die orifice much more rapidly and easily, and at a lower pressure, than it does through the relatively thin portions of the die orifice. This results in an extruded product which due to the inequality of length of the thick and thin sections thereof, is scalloped or distorted. In extruding rubber products having unequal wall thicknesses, the finished product may be so badly distorted as to resemble the convolutions of the human brain. Moreover, the rapid flow of stock through the heavy portions of the die causes a deficiency of material in the light or thin sections of the die, resulting in thin, perforate, poorly compacted and easily torn walls in the extruded product. This invention contemplates the provision of means for retarding or impeding the flow of stock material through the thick portions of the die orifice, to the end that the operating pressure will be rendered substantially uniform over the entire area of the die orifice, and so that all parts of the extruded article will proceed from the die at equal rates of speed.

Other objects are simplicity and economy, efficiency and dependability, and adaptability for use in dies of substantially any configuration or size.

With these objects in view, as well as other objects which will appear in the course of the specification, reference will be had to the drawing, wherein:

Fig. 1 is a fragmentary longitudinal mid-section through the cylinder and die of an extruding machine adapted to carry out my invention, with parts left in elevation.

Fig. 2 is a section taken on line II—II of Fig. 1.

Fig. 3 is an enlarged transverse section of the die and core members only, taken on line III—III of Fig. 1.

Fig. 4 is an enlarged fragmentary perspective view of the product produced by the machine as shown.

Like reference numerals apply to similar parts throughout the several views, and the numeral 2 applies generally to a fragmentary showing of a representative extruding machine including a hollow cylinder 4 in which is axially disposed an auger 6. Said auger is rotated axially by power means, not shown, whereby stock material introduced into the rearward portion of the cylinder is advanced through said cylinder toward the forward end thereof. The forward end wall 8 of the cylinder has a central aperture 10 about which is disposed an outwardly extending flange 12 integral with wall 8. An externally cylindrical die member 14 fits slidably in flange 12, and extends outwardly through an aperture 16 in a cap 18 which is internally threaded to engage threads formed externally on flange 12. Said cap engages a shoulder 20 formed externally on die 14 to hold said die firmly in position against the outward pressure of the stock material thereagainst.

The specific formation of the die of course depends on the article it is desired to produce, and it is contemplated that this invention will be applicable when producing any article having relatively thick and thin wall sections. However, the die shown is adapted to produce an article, shown fragmentarily in Fig. 4, having a relatively thin walled tubular body portion 22 having an integral and relatively thick rib 24 extending longitudinally along one side thereof, said rib being connected to said body portion by a thin neck 26. It is also contemplated that the article shall be formed of rubber, and shall after being extruded be cut transversely into short lengths to form a special type of elastic rubber band, although this is not intended in any way to limit my invention to such articles.

Die member 14 is hence provided with a circular passageway 28 extending axially therethrough, the outer end portion 30 thereof being cylindrical and of a diameter corresponding to the desired external diameter of body portion 22 of the finished product, and the inner end portion 32 being conical whereby to compress and direct the stock material to portion 30. The die orifice 34 for producing rib 24 of the finished product is formed through die 14 parallel to the axis of passageway 28, and is connected to passageway 28 by a narrow slit 36 for forming neck 26. Orifice 34 and slit 36 extend through the wall of the conical portion 32 of passageway 28.

A cylindrical core member 38 is disposed axially within die member 14, being of smaller diameter than the cylindrical portion 30 of die passageway 28. A thin annular space 40 is formed between core 38 and the passageway 30 of the die, said space constituting the orifice for producing the body portion 22 of the finished product. Core 38 extends axially into cylinder 4, and is threaded at its inner end into a block 42 disposed centrally in said cylinder. Said block is supported by a spider comprising four rods 44 which are threaded at their inner ends into the block and which extend radially outwardly therefrom through the wall of cylinder 4, being threaded at their outer ends to receive nuts 46 whereby block 42 and core 38 may be accurately and positively positioned within the cylinder. One of rods 44 has an axial bore 48 formed therethrough, communicating at its inner end with a passageway 50 formed in block 42, said passageway in turn communicating with an axial bore 52 formed through core 38 and opening at the outer end thereof. The passageway 48—50—52 provides a means whereby the internal surface of the tubular product may be sprayed with powder or the like as it leaves the die, in order to facilitate the subsequent positioning of the product over drying and curing mandrels.

Referring to Fig. 1 and 3, it will be seen that the walls of die 14 surrounding the rib orifice 34 thereof are formed to present closely spaced grooves 54, said grooves being parallel and extending parallel to the axis of the die, and all the way through the die. These grooves of course produce corresponding ribs 56 on the rib 24 of the finished product, as shown in Fig. 4. These grooves in the die greatly increase the peripheral length of the rib orifice 34 without greatly increasing the overall area thereof, and therefore produce a substantial increase in the frictional drag on the stock material as it is forced through this portion of the die. By properly proportioning the number, size, and disposition of the grooves used on the thick portions of the die orifice in any given die, a condition may be reached wherein the average pressure required to force the stock material through the thick portions of the die orifice is equal to that required to force the material through the thin portions of the die orifice, and all portions of the extruded article will be formed at an equal speed and at equal pressure. Although the particular proportioning and placement of the grooves will of course be affected by many variables in different dies, the arrangement shown has proved quite satisfactory for the die shown when used to produce articles of rubber such as is used in ordinary elastic bands. Also the die shown will not, without the grooves, produce a useable product. While the grooves do not produce any direct friction on the material at the axial center portion of the rib orifice, the internal friction of the stock material itself is sufficient to extend the dragging effect of the grooves into said axial central portion.

Another feature which contributes to an increased frictional drag on the stock material passing through the rib orifice 34 is the fact that said orifice is longer, in the direction of travel of the stock therethrough than is the orifice 40 for producing the relatively thin-walled body portion 22. The added length of the orifice 34 requires a greater pressure to force material therethrough. This effect is somewhat reduced by the fact that the material enters the initial portion of orifice 34 before the entire die orifice has been reduced to its minimum or exit dimensions, with the result that the material tends to flow in all directions to equalize the pressure. However, at normal operating speeds the internal friction of the stock material is such as to require that most, while not all, of the material forming the rib must flow through the entire length of orifice 34, and therefore be subjected to an added frictional load. This effect is particularly evident where, as in the die shown, the connection of the thick portion to the thin portion is abrupt and restricted, thereby inhibiting the free flow of stock material therebetween.

While I have shown and described a specific instance of the application of my method and apparatus, it is apparent that many minor variations of structure and operation could be made without departing from the spirit of the invention.

What I claim as new and desire to protect by Letters Patent is:

1. A die for extruding articles of rubber having relatively thick and relatively thin wall sections wherein the die walls encompassing those portions of the die orifice adapted to produce said relatively thick wall sections are longer, in the direction of flow of the stock material therethrough, than the die walls encompassing those portions of the die orifice adapted to produce said relatively thin wall sections, and wherein the die walls encompassing those portions of the die orifice adapted to produce said relatively thick wall sections have a plurality of grooves formed therein extending parallel to the direction of flow of stock material therethrough.

2. An extrusion die comprising a die member having a passageway formed therethrough, said passageway having a conical entrance section and a cylindrical exit section, and a cylindrical core member extending axially through said passageway and having a diameter less than the cylindrical section of said passageway whereby to form a relatively thin annular orifice between said die and core members, said die member having a relatively thick orifice formed therethrough parallel to and spaced outwardly from said annular orifice and connected with said annular orifice by a relatively narrow slit, the walls of said relatively thick orifice having grooves formed therein parallel to the axis of the die.

References Cited in the file of this patent

UNITED STATES PATENTS

| Number | Name | Date |
| --- | --- | --- |
| 738,295 | Coldren | Sept. 8, 1903 |
| 1,752,702 | Shipley | Apr. 1, 1930 |
| 2,446,493 | Silvia et al. | Aug. 3, 1948 |